United States Patent [19]

Itoh

[11] Patent Number: 5,331,542
[45] Date of Patent: Jul. 19, 1994

[54] METHOD AND APPARATUS FOR GENERATING ACCELERATION AND DECELERATION PATTERNS FOR ROBOT CONTROL

[75] Inventor: Ietoshi Itoh, Tokyo, Japan
[73] Assignee: Sony Corporation, Japan
[21] Appl. No.: 858,005
[22] Filed: Mar. 26, 1992

[30] Foreign Application Priority Data

Apr. 3, 1991 [JP] Japan ................................. 3-096089

[51] Int. Cl.$^5$ .............................................. G06F 15/46
[52] U.S. Cl. .................................. 364/167.01; 901/20; 318/568.18
[58] Field of Search ................... 364/167.01; 901/2, 5, 901/6, 18, 20, 23; 318/567, 568.11, 568.12, 568.15, 568.17, 568.18; 395/80, 85, 88

[56] References Cited

U.S. PATENT DOCUMENTS

| | | | |
|---|---|---|---|
| 4,864,205 | 9/1989 | Fisher | 318/568.11 |
| 4,970,448 | 11/1990 | Torii et al. | 364/167.01 |
| 5,014,183 | 5/1991 | Carpenter et al. | 364/167.01 |
| 5,179,514 | 1/1993 | Rastegar et al. | 364/167.01 |

FOREIGN PATENT DOCUMENTS

| | | |
|---|---|---|
| 0191103 | 8/1986 | European Pat. Off. . |
| 0262600 | 4/1988 | European Pat. Off. . |
| 0268491 | 5/1988 | European Pat. Off. . |
| 0333867 | 9/1989 | European Pat. Off. . |

OTHER PUBLICATIONS

European Search Report.

*Primary Examiner*—Jerry Smith
*Assistant Examiner*—Cameron H. Tousi
*Attorney, Agent, or Firm*—Ronald P. Kananen

[57] ABSTRACT

An apparatus and a method for generating acceleration and deceleration patterns for control of a robot in a servo system which is equipped with a plurality of driving axes so constituted as to mutually exert dynamic interference, in such a manner that a synchronism is attained at acceleration start points, velocity peak points and deceleration end points in the patterns for the individual driving axes. Peak time calculating means responds to the information relative to dynamic parameters from constant setting means and command means, and calculates the peak time, which is required until the velocity reaches its peak after the pattern generation start point, from the kinetic energy consumed for each displacement and also from the power distribution relative to the driving sources. And pattern generating means generates, on the basis of the peak time thus obtained, an acceleration pattern and a temporally reflected deceleration pattern for each driving axis, whereby the tact time required for each displacement can be minimized.

6 Claims, 8 Drawing Sheets

METHOD AND APPARATUS FOR GENERATING ACCELERATION AND DECELERATION PATTERNS FOR ROBOT CONTROL

BACKGROUND OF THE INVENTION

1. Field of the Invention

The present invention relates to a method and an apparatus for generating acceleration and deceleration patterns for control of a robot in a servo system which is equipped with a plurality of driving axes so constituted as to mutually exert dynamic interference, in a manner to shorten the required time of movement by such patterns adequate to draw out the maximum power from a driving source.

2. Description of the Prior Art

One of the effective indexes in examining the kinetic capability of a robot is a working tact time. It is preferable that the tact time is minimized and that no unnecessary vibration is concomitant.

Some methods have been proposed heretofore for minimizing the tact time. One of them is carried out by optimizing an acceleration-deceleration curve relative to a servo system.

First, with reference to FIGS. 10 and 11, a brief description will be given on the exemplary method proposed by the present applicant as disclosed in Japanese Patent Application No. Hei 2 (1990)-283867, now Japanese Published Application No. 4-157508.

Figure 10:
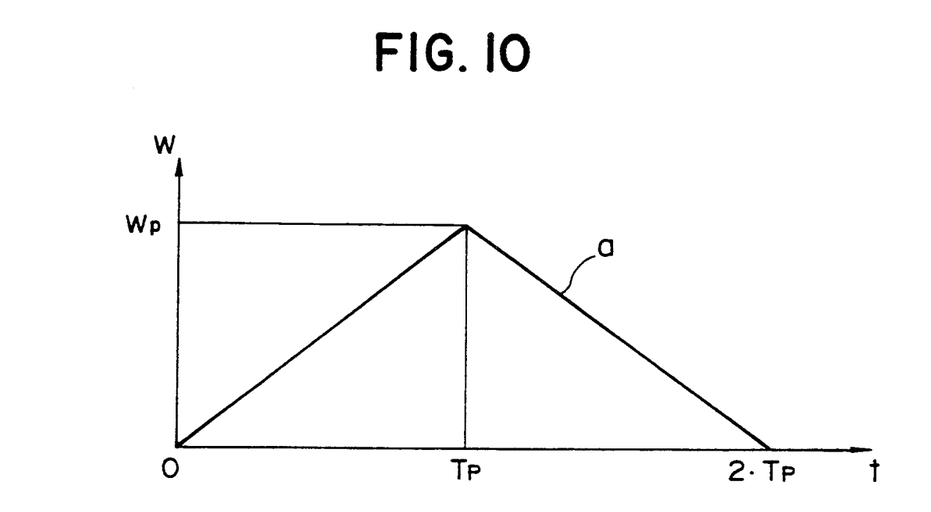
FIG. 10 graphically shows an example of acceleration and deceleration patterns which are generated with respect to one driving axis.

Denoted by a in FIG. 10 is an acceleration-deceleration curve, where the time required for the velocity $\omega$ to reach its peak value ($\omega p$) from an acceleration start instant ($t=0$) is termed "peak time" (hereinafter abbreviated to Tp), and in contrast with an acceleration pattern until such peak time, a deceleration pattern is obtained by execution of a temporal reflection with respect to $t=Tp$.

The acceleration-deceleration curve a is determined by changing the peak time Tp in accordance with the displacement.

Figure 11:
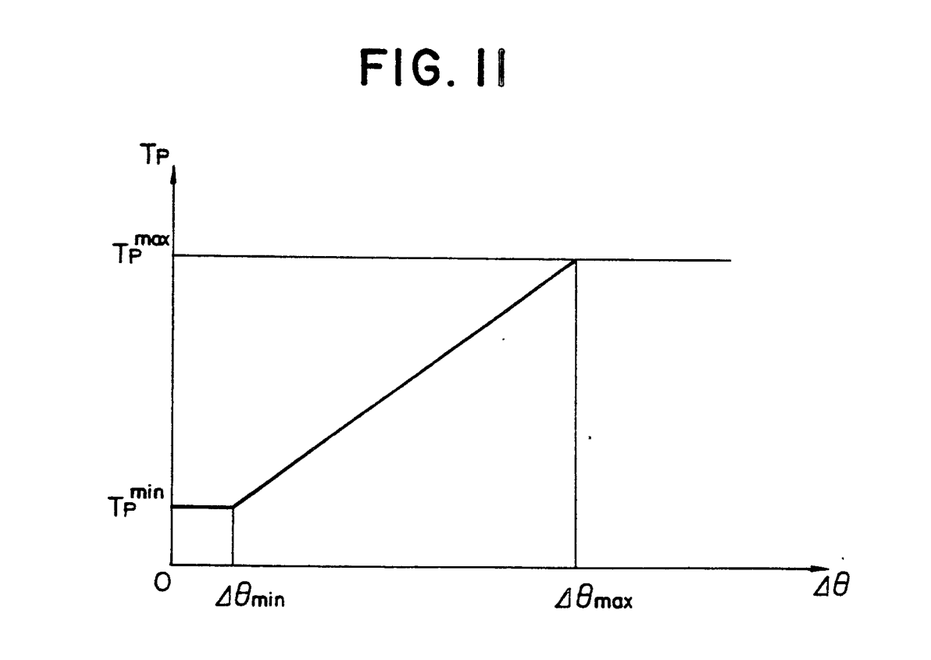
FIG. 11 graphically shows the relationship between displacement and peak time.

More specifically, as shown in FIG. 11, there is previously prescribed the characteristic with respect to the displacement ($\Delta\theta$) and the peak time Tp, and in generating acceleration and deceleration patterns, first an acceleration pattern is generated in such a manner that the time required for the velocity to reach the peak value from the acceleration start point becomes equal to the peak time corresponding to the displacement, and thereafter a deceleration pattern is generated by the technique of temporal symmetrization.

Although the method mentioned above is considered to be sufficiently effective in a servo system in the situation wherein there is no dynamic interference between a plurality of driving axes as in an orthogonal type robot, a problem arises in the case such a method is applied to a multiaxial scalar type robot.

Figure 12A:
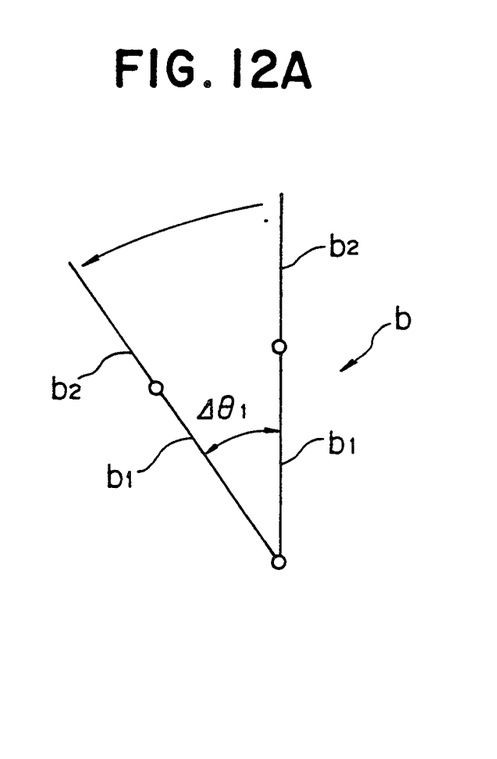
Figure 12B:
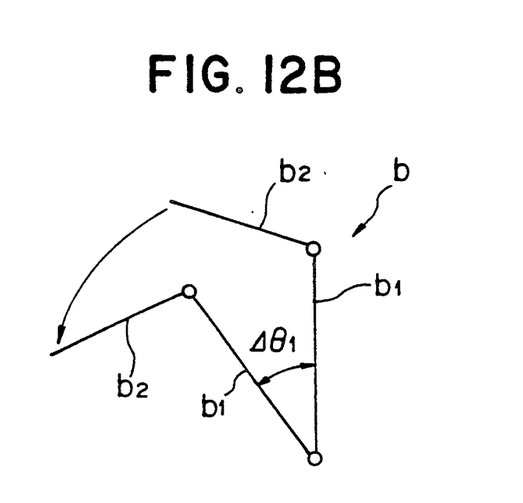
FIG. 12B shows a second situation in which the arms are rotated in a mutually rotated state.

FIG. 12 schematically shows the motion of a biaxial scalar type robot b. In this robot, a second arm b2 is rotatably connected to the fore end of a first arm b1.

FIG. 12A shows the situation wherein the two arms b1, b2 have rotated through an angle $\Delta\theta 1$ with the two arms b1 and b2 linearly extended, and FIG. 12B shows the situation after rotation through an angle of $\Delta\theta 1$ with the second arm b2 at an angle with respect to the first arm b1. In both cases, the rotation angle $\Delta\theta 2$ of the second arm b2 is zero.

As will be understood by careful observation of the motions of both arms, the control aspect becomes different depending on the relationship between the arms b1 and b2. With respect to the moment of inertia at the center of rotation of the first arm b1, the moment in the situation shown in FIG. 12A is greater than that shown in FIG. 12B, so that greater power is needed in the former even though the two motions have the same displacement $\Delta\theta 1$. A longer time is also required before the movement comes to a halt.

That is to say, if the acceleration and deceleration patterns for each arm are generated using the same concept as that applied to orthogonal type robots irrespective of the circumstances, it follows that the same peak time Tp is used in both of the situations shown in 12A and 12B.

Therefore, the robot b is actuated with a greater Tp value as compared with the situation shown in FIG. 12B. This lengthens the tact time (2·Tp).

In an attempt to eliminate such a disadvantage, it is possible to consider changing the peak time Tp in accordance with the displacements $\Delta\theta 1$ and $\Delta\theta 2$ of the arms.

However, correct determination of such a change requires a lot of experience and is highly dependent on the operator's level of experience and ability. Even if a satisfactory result is attained, there still remains the possibility that the best selectable setting is not achieved or that some additional operations may be needed in case the normal operation fails to completely meet the requirements.

For example, it may be possible to contrive a method of first dividing the operations into a number of probable cases, empirically determining optimal Tp values for each case, subsequently writing the optimal values into ROMs or the like, and using such values as references in generating acceleration and deceleration patterns. However, a lot of complicated work is necessary in order to complete the ROMs, and such must be repeated during the development of every new robot.

OBJECT AND SUMMARY OF THE INVENTION

It is therefore an object of the present invention to provide an improvement which is capable of generating acceleration and deceleration patterns by dynamically analyzing the motion of a robot, representing the mutual interference of arms by logical expressions, and calculating the appropriate peak time with regard to the motion therefrom.

According to the present invention, dynamic constants (such as moment of inertia) specific to a servo system are set by a constant setting means, while dynamic parameters, such as the start and end points of each displacement, are designated by command means in response to instructions for the displacement.

Following this, a peak time calculating means calculates the peak time on the basis of the above information and then sets the peak time.

In this stage, an energy computing means which forms part of the peak time calculating means expresses the dynamic parameters as functions of peak time, and computes the entire kinetic energy required for the displacement as a function of the peak time. The energy computing means determines a driving source from which each energy term is supplied with a power, and derives the peak time by equalizing the relevant energy term with respect to the maximum power value allowable by the driving source.

Subsequently, a peak time setting means which forms part of the peak time calculating means selects, as the peak time of the entire system, a maximum from the peak time values thus obtained with respect to the individual driving axes.

Thereafter, a pattern generating means generates acceleration and deceleration patterns on the basis of the selected peak time. More specifically, an acceleration pattern relative to each driving axis is generated in such a manner that the time required for the velocity to reach its peak value from point in time where the acceleration starts becomes equal to the value obtained by the peak time setting means. Following this, a temporally reflected deceleration pattern is generated by temporal symmetrization of the acceleration pattern.

According to the present invention, the acceleration and deceleration patterns can be optimized by modeling the servo system with respect to the mutual dynamic interference of arms, using energy based logical expressions, the power of the driving source and the power distribution, and then calculating the optimal value of the peak time Tp. This reduces the tact time by efficiently utilizing the power of the driving source.

As the algorithm is logically definite, there is no need for the operator's ability or experience to intervene. Furthermore, it is no longer necessary to acquire huge amounts of experimental data for each individual robot and to utilize such data for control.

The above and other features and advantages of the present invention will become apparent from the following description which will be given with reference to the accompanying drawings.

BRIEF DESCRIPTION OF THE DRAWINGS

FIGS. 12A and 12B schematically show the motion of a biaxial scalar type robot discussed in the opening paragraphs of the instant disclosure wherein FIG. 12A shows the robot arms rotated in a linearly aligned state, and wherein

DESCRIPTION OF THE PREFERRED EMBODIMENTS

Prior to describing the acceleration-deceleration pattern generating apparatus of the present invention, explanation will first be given of the principle of the invention. This explanation will be based on physical analysis, with reference to an exemplary biaxial scalar type robot to be controlled.

In the present invention, the operation of a robot is dynamically analyzed, and the mutual interference of arms (viz., the influence of the motion of one arm upon that of the other) is represented by logical expressions. These logical expressions are then utilized for determining the peak time Tp and for shortening the tact time.

Figure 3:
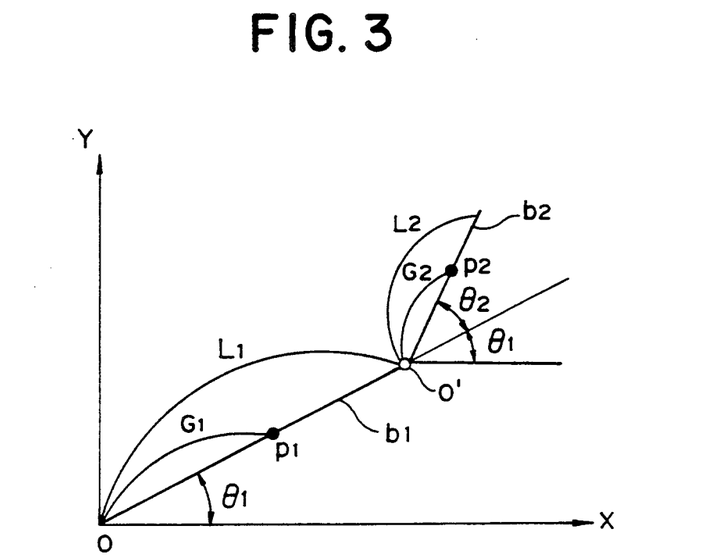
FIG. 3 shows a modeled motion which is typical of a biaxial scalar type robot.

FIG. 3 shows a typical modeled motion of a biaxial scalar type robot, wherein a first arm b1 is rotated about an origin O of X-Y orthogonal coordinates, while a second arm b2 is rotated about a rotational end (point O') of the first arm b1.

Parameters relating to the two arms b1 and b2 are defined in Table 1 below.

TABLE 1

| Definitions of Parameters, etc. | |
|---|---|
| Symbol | Meaning |
| P1 | Position of inertial center of first arm |
| P2 | Position of inertial center of second arm |
| L1 | Length of first arm |
| G1 | Distance from origin O to point P1 (OP1) |
| L2 | Length of second arm |
| G2 | Distance from point O' to point P2 (OP2) |
| $\theta1$ | Angle formed by center axis of first arm with X-axis |
| $\theta2$ | Angle formed by center axis of second arm with that of first arm |
| M1 | Mass of first arm |
| M2 | Mass of second arm |
| I1 | Inertia moment of first arm (around P1) |
| I2 | Inertia moment of second arm (around P2) |

It is to be noted that the angle parameter $\theta2$ is not based on the angle formed by the center axis of the second arm b2 with the X-axis, but on the measured angle formed in the X-Y plane by the center axis of the second arm b2 with that of the first arm b1.

In the following dynamic analysis description, the robot system is idealized by adopting the assumptions and approximations listed below, so as not to unnecessarily complicate the explanation:

(1) it is assumed that there is no viscosity term.
(2) It is assumed that each robot arm is precisely responsive to any command value for servo control.
(3) It is assumed that energy which is converted into heat and dissipated is negligible and is ignored.
(4) In the acceleration-deceleration curve used, the acceleration-deceleration patterns are symmetrized using temporal reflection.
(5) It is assumed that the power consumption of an arm driving motor during acceleration and during deceleration are equal to each other.

First the kinetic energy in the robot system shown in FIG. 3 is calculated. In FIG. 3, points P1 and P2 are represented by polar coordinates where the X-Y coordinates are regarded as a complex plane (in which the Y-axis is selected as an imaginary axis). The position of each point can then be expressed as:

$$P1 = G1 \cdot \exp(i \cdot \theta1)$$

$$P2 = L1 \cdot \exp(i \cdot \theta 1) + G2 \cdot \exp[i \cdot (\theta 1 + \theta 2)] \qquad (1)$$

where i denotes an imaginary numerical unit.

Calculations of the velocities at the points P1 and P2, involves linear differentiation executed with respect to time t as follows:

$$\frac{dP1}{dt} = G1 \cdot \frac{d\theta 1}{dt} \cdot \exp\left[i \cdot \left(\theta 1 + \frac{\pi}{2}\right)\right] \qquad (2)$$

$$\frac{dP2}{dt} = L1 \cdot \frac{d\theta 1}{dt} \cdot \exp\left[i \cdot \left(\theta 1 + \frac{\pi}{2}\right)\right] +$$

$$G2 \cdot \left(\frac{d\theta 1}{dt} + \frac{d\theta 2}{dt}\right) \cdot \exp\left[i \cdot \left(\theta 1 + \theta 2 + \frac{\pi}{2}\right)\right]$$

The kinetic energy E(all) of the entire system is represented by the sum of the translational kinetic energy relative to the arms b1, b2 and the rotational energy around each centroid, and is given by:

$$E(\text{all}) = \frac{1}{2} \cdot M1 \cdot \left|\frac{dP1}{dt}\right|^2 + \frac{1}{2} \cdot I1 \cdot \left(\frac{d\theta 1}{dt}\right)^2 + \qquad (3)$$

$$\frac{1}{2} \cdot M2 \cdot \left|\frac{dP2}{dt}\right|^2 + \frac{1}{2} \cdot I2 \cdot \left(\frac{d\theta 1}{dt} + \frac{d\theta 2}{dt}\right)^2$$

On the right side of Eq. (3), the first term corresponds to the translational kinetic energy of the first arm b1, the second term to the rotational energy around the point P1, the third term to the translational kinetic energy of the second arm b2, and the fourth term to the rotational energy around the point P2, respectively.

The values relative to the terms including the linear differentials of the points P1 and P2 with respect to time are squares of the absolute values thereof, signifying that the linear differential terms are multiplied by the respective complex conjugates, whereby each term is converted into a real number. (This process is necessary because the X-Y coordinate system is taken as being a complex plane.)

By substituting Eq. (2) into the right side of Eq. (3), the energy E(all) can be expressed as:

$$E(\text{all}) = \frac{1}{2} \cdot (A1 + A2 \cdot \cos\theta 2) \cdot (\omega 1)^2 + \qquad (4)$$

$$\frac{1}{2} \cdot B1 \cdot (\omega 2)^2 + \frac{1}{2} \cdot (C1 + C2 \cdot \cos\theta 2) \cdot \omega 1 \cdot \omega 2$$

where:

$$\omega 1 = \frac{d\theta 1}{dt}$$

$$\omega 2 = \frac{d\theta 2}{dt}$$

$$A1 = M1 \cdot G1^2 + I1 + M2 \cdot L1^2 + M2 \cdot G2^2 + I2 \qquad (5)$$
$$A2 = 2 \cdot M2 \cdot L1 \cdot G2$$
$$B1 = M2 \cdot G2^2 + I2$$
$$C1 = 2 \cdot M2 \cdot G2^2 + 2 \cdot I2 = 2 \cdot B1$$
$$C2 = 2 \cdot M2 \cdot L1 \cdot G2 = A2$$

As demonstrated by Eq. (5) the time differentials per rotation with respect to the angle parameters $\theta 1$, $\theta 2$ are defined as angular velocities $\omega 1$, $\omega 2$ respectively. As will be understood the energy E(all) can be divided, using such differentials, into three terms, i.e., a square term of the velocity $\omega 1$, a square term of the velocity $\omega 2$, and a term of the product of the velocities $\omega 1$ and $\omega 2$.

Eq. (4) represents the energy of the entire system when the first arm b1 is moved at the angular velocity $\omega 1$ while the second arm b2 is moved at the angular velocity $\omega 2$ up to the position with $\theta 2$.

The constants (A1, A2, B1, C1, C2) in Eq. (5) are the values specific to the robot system.

Figure 4:
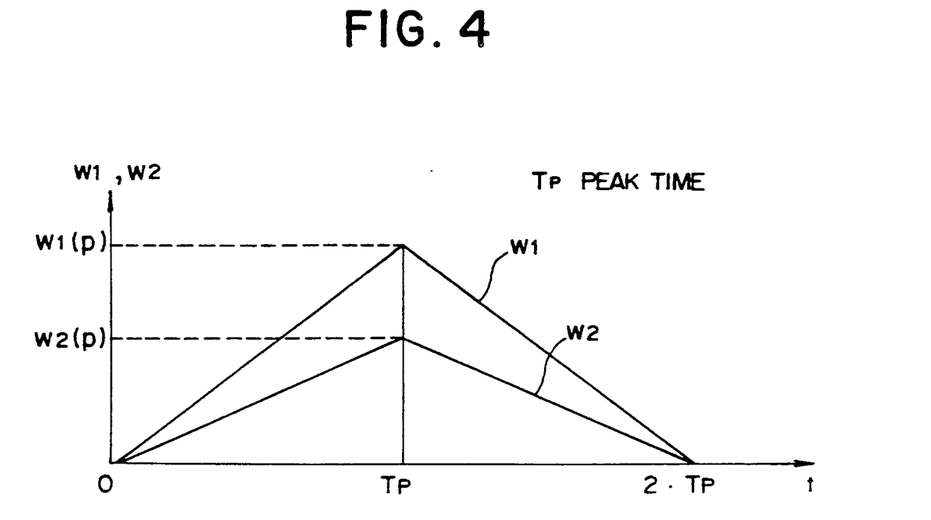
FIG. 4 graphically shows an exemplary acceleration-deceleration curve.

For the purpose of simplifying the explanation, we will consider the triangular pattern of FIG. 4 as an acceleration-deceleration curve for controlling the motions of the arms b1 and b2.

In the graphic representations shown in FIG. 4 where the angular velocities $\omega 1$, $\omega 2$ are plotted on the ordinate and the time t plotted on the abscissa, in one illustrated pattern, the velocity $\omega 1$ rises from the origin with a fixed slope (acceleration is constant) and, after reaching the peak value $\omega 1(P)$ at a point $t = Tp$, decelerates with a fixed slope and terminates at a point $t = 2 \cdot Tp$. Meanwhile, in the other illustrated pattern, the velocity $\omega 2$ rises with a fixed slope from the origin and, after reaching the peak value $\omega 2(P)$ at the point $t = Tp$, then decelerates and terminates at the point $t = 2 \cdot Tp$.

Thus, each pattern is linearly symmetrical with respect to the point $t = Tp$, and the acceleration pattern and the deceleration pattern are so formed as to be mutually superposed by temporal reflection. Both arms are retained in synchronism with each other relative to the acceleration start point, the peak point ($t = Tp$) of the angular velocity, and the termination point (or deceleration end point).

The energy E(all:P) of the entire system at the peak point ($t = Tp$) of the angular velocity in such acceleration and deceleration patterns is obtained by substituting $\omega 1 = \omega 1(P)$, $\omega 2 = \omega 2(P)$ and $\theta 2 = \theta 2(P)$ (value of $\theta 2$ at $t = Tp$) for Eq. (4) and it is calculated as:

$$E(\text{all}:P) = \frac{1}{2} \cdot (A1 + A2 \cdot \cos\theta 2(P)) \cdot [\omega 1(P)]^2 + \qquad (6)$$

$$\frac{1}{2} \cdot B1 \cdot [\omega 2(P)]^2 + \frac{1}{2} \cdot [C1 + C2 \cdot \cos\theta 2(P)] \cdot \omega 1(P) \cdot \omega 2(P)$$

Thus, Eq. (6) represents the entire dynamic energy E(all:P) when the angular velocities $\omega 1$, $\omega 2$ have reached the respective peak values $\omega 1(P)$, $\omega 2(P)$ simultaneously, and such energy E(all:P) is supplied naturally from the arm driving mechanism.

When the robot system proceeds to the deceleration from the point $t = Tp$ where the energy E(all:P) is retained, if the arm driving mechanism is so designed as to be capable of reusing such energy, it becomes possible to operate the robot system from the deceleration start point to the termination point without the necessity of supplying any new energy (on condition that any loss derived from the friction is neglected).

Figure 5:
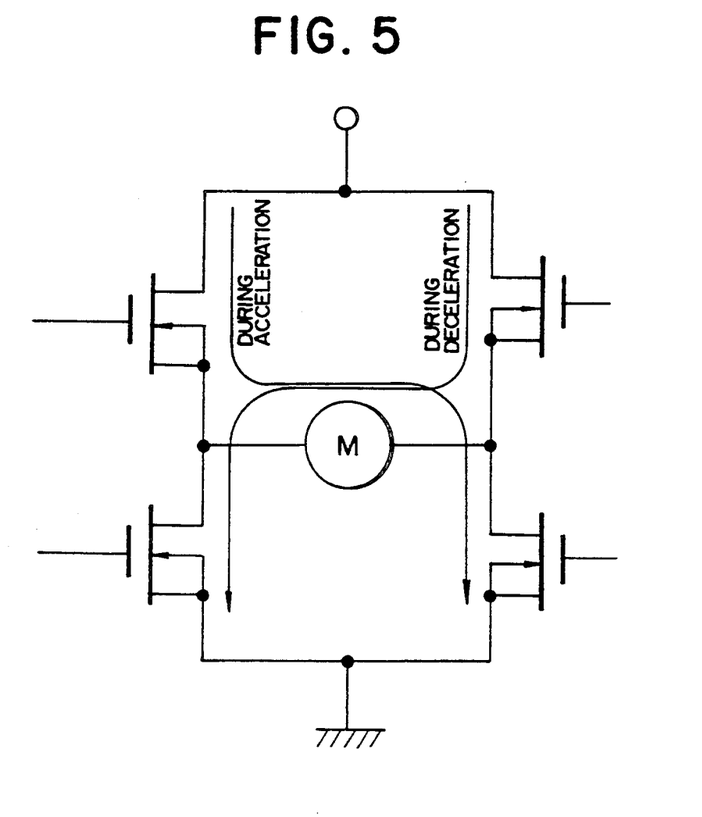
FIG. 5 is a schematic diagram showing the configuration of a motor driving circuit.

In any practical driving mechanism, however, such reuse of the energy is impossible and, to the contrary, energy substantially equal to E(all:P) is consumed at the time of deceleration. For example, in a bridge type motor driving circuit of FIG. 5, energy substantially equal to the above is consumed during each acceleration and deceleration event.

It follows that double the energy E(all:P) is required for the robot system over the stages of acceleration and deceleration.

Accordingly, with reference to the total power W of the motors to drive the arms b1 and b2, the energy W·(2·Tp) supplied during the time up to 2·Tp is supposed to be equal to the required energy 2·E(all:P). Therefore the relationship represented by Eq. (7) below is obtained:

$$W \cdot (2 \cdot T_p) = 2 \cdot E(all:P) \tag{7}$$

Since the enclosed area between the acceleration-deceleration curve and the time axis in FIG. 4 corresponds to the angular displacements $\Delta\theta1$ and $\Delta\theta2$, $$\omega1(P) = \frac{\Delta\theta1}{T_p} \tag{8}$$

$$\omega2(P) = \frac{\Delta\theta2}{T_p}$$

Eq. (9) is obtained by substituting Eq. (8) for Eq. (6) to solve for the peak time Tp. Meanwhile, Eq. (10) is obtained by substituting Eq. (8) for Eq. (6) to solve for the peak time Tp.

$$T_p = \sqrt{\frac{[A1 + A2 \cdot \cos\theta2(P)] \cdot (\Delta\theta1)^2 + B1 \cdot (\Delta\theta2)^2 + [C1 + C2 \cdot \cos\theta2(P)] \cdot (\Delta\theta1) \cdot (\Delta\theta2)}{2 \cdot E(all:P)}} \tag{9}$$

$$T_p = \sqrt[3]{\frac{[A1 + A2 \cdot \cos\theta2(P)] \cdot (\Delta\theta1)^2 + B1 \cdot (\Delta\theta2)^2 + [C1 + C2 \cdot \cos\theta2(P)] \cdot (\Delta\theta1) \cdot (\Delta\theta2)}{2 \cdot W}} \tag{10}$$

Eq. (9) represents Tp by the parameters ($\Delta\theta1$, $\Delta\theta2$, $\theta2(P)$) and the energy E(all:P) when the arms b1 and b2 are displaced in accordance with the acceleration-deceleration curve of FIG. 4, in which $\Delta\theta1$ and $\Delta\theta2$ are the respective displacements of the arms b1 and b2, and $\Delta\theta2$ (P) is the position where the velocity of the second arm b2 reaches its peak (t=Tp). This equation is useful for determining the dynamic constants A1, A2, B1 and so forth.

When the robot is so driven as to perform a reciprocative motion without a pause, the entire energy per reciprocation is 2·E(all:P), so that the peak time Tp is given by Eq. (9).

In an exemplary case where $\Delta\theta2=0$, $\theta2(P)=\pi/2$ for calculating the constant A1, Eq. (11) is obtained by substituting the above values for Eq. (9).

$$T_p = \sqrt{\frac{A1 \cdot (\Delta\theta1)^2}{2 \cdot E(all:P)}} \tag{11}$$

Eq. (11) represents an aspect where the first arm b1 alone is actuated in accordance with the triangular acceleration-deceleration curve.

Figure 6:
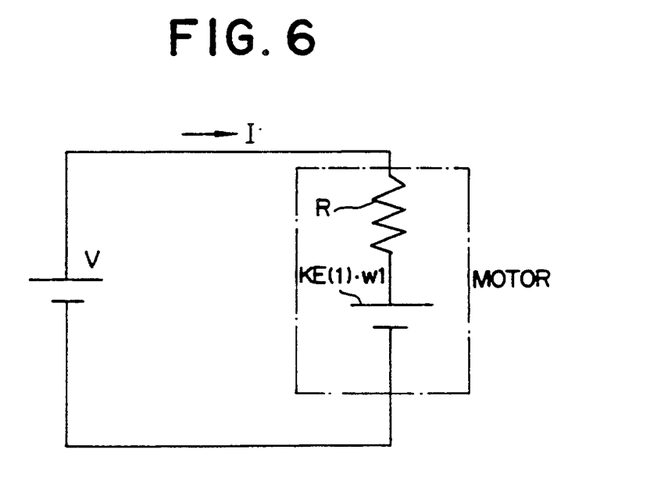
FIG. 6 is a circuit diagram of the motor driving circuit.

FIG. 6 is an equivalent circuit diagram relative to the motor for the first arm b1. With respect to this circuit, Eq. (12) represents the relationship which exists between voltage V, current I, internal resistance R, counterelectromotive force constant KE(l), and angular velocity $\omega1$.

$$V \cdot I = I^2 \cdot R + KE(l) \cdot I \cdot \omega l \tag{12}$$

Multiplying the two sides of Eq. (12) by dt forms Zq. (13). The left side of this equation represents the supply energy, while the first term of the right side represents the resistance loss, and the second term thereof represents the dynamic energy of the motor.

$$V \cdot I \cdot dt = I^2 \cdot R \cdot dt + KE(l) \cdot I \cdot \omega l \cdot dt \tag{13}$$

The energy 2·E(all:P) is given by the time integral (interval $0 \le t \le 2 \cdot Tp$) of the second term of the right side of Eq. (13). It is expressed as:

$$2 \cdot E(all:P) = 2 \cdot KE(1) \cdot I \cdot \int_0^{T_p} \omega l\, dt \tag{14}$$

It is to be noted that, in the right side of Eq. (14), the current I is fixed and is out of the integral since the acceleration in the acceleration-deceleration curve is fixed, and the integral becomes double the value in the interval ($023\, t \le Tp$) due to the symmetry of the acceleration-deceleration curve. In the acceleration-deceleration curve of FIG. 4, the acceleration pattern can be expressed by a linear expression of Eq. (15) having a fixed slope as:

$$\omega l = \frac{\omega l(P)}{T_p} \cdot t \tag{15}$$

Therefore an integration is executed with substitution of Eq. (15) for Eq. (14) and, after $\omega1(P) \cdot Tp$ is replaced with $\Delta\theta1$ according to the first expression of Eq. (8), the result thereof is substituted for Eq. (11) yielding Eq. (16) as follows:

$$T_p = \sqrt{\frac{A1 \cdot \Delta\theta1}{KE(1) \cdot I}} \tag{16}$$

In finding the constant A1 by actual measurement from Eq. (16) the first arm b1 alone is actuated without any pause under the conditions of $\Delta\theta2=0$ and $\theta2(P)=\pi/2$ with a displacement $\Delta\theta1$ and a peak time Tp. The effective current I flowing in the motor is measured and substituted for Eq. (16), whereby the constant A1 can be calculated. (In this case, KE(l) is assumed to have a known value.)

The constants A2 and B1 can also be calculated by actual measurement in the same manner as the above. As for the calculation of the constant A2, Eq. (17) is obtained under the conditions wherein $\Delta\theta2=0$ and $\omega2(P)=0$. Meanwhile the constant B1, Eq. (18) is obtained under the condition wherein $\Delta\theta1=0$.

$$T_p = \sqrt{\frac{(A1 + A2) \cdot \Delta\theta1}{KE(1) \cdot I}} \tag{17}$$

$$T_p = \sqrt{\frac{B1 \cdot \Delta\theta2}{KE(2) \cdot I}} \tag{18}$$

The constants A1 and A2 can be calculated by solving Eq. (17) and Eq. (16) simultaneously. As for Eq. (18), the desired result is obtained by measuring the effective current while repeating the motion of the second arm b2 alone. (In this case, the counterelectromotive force constant KE(2) relative to the second-arm driving motor is assumed to have a known value.)

After the constants A1, A2 and B1 have thus been obtained, the remaining constants C1 and C2 can be calculated with ease from the relationship of C1=2·B1 and C2=A2 in Eq. (5).

Such constants originally have values which can be derived by calculation if the dynamic parameters and the like are exactly known as given in Eq. (5). Practically, however, there exist some difficulty in accurately calculating the centroid position and the like. In view of such practical difficulties, the above method of calculating the constants on the basis of the actual motion of the robot is considered to be simpler and superior in that it reflects the robot motion more faithfully.

Since sequential preparations have thus been completed through the dynamical analysis relative to the robot system, a description will be given with respect to the significance of Eq. (10) above.

Eq. (10) represents the relationship between the peak time Tp and the power W of the driving motors of the arms b1 and b2, as will be understood from the process of deriving the equation.

As will be understood from the expression where the power W is placed in the denominator of the cubic root, the tact time (=2·Tp) can be reduced by increasing the power W.

However, it is impossible to increase the power W infinitely since the power W is the sum of the respective powers of the driving motors for the arms b1 and b2.

More specifically, the condition represented by Eq. (19) below is imposed on the power W with respect to the output W1 and the maximum output W1m of the driving motor for the first arm b1 and also to the output W2 and the maximum output W2m of the driving motor for the second arm b2.

$$W = W1 + W2 \leq W1m + W2m$$

where:

$$W1 \leq W1m$$

$$W2 \leq W2m \quad (19)$$

The condition includes a restriction that total power W should not exceed the sum of W1m+W2m, and simultaneously a restriction that the individual powers or outputs W1 and W2 of the two motors should not exceed the respective maximum outputs W1m and W2m.

In an attempt to simplify the relationship between Eqs. (19) and (10), Eq. (10) may be modified to form Eq. (20).

$$W = A \cdot \frac{(\Delta\theta 1)^2}{2 \cdot T_p^3} + B \cdot \frac{(\Delta\theta 2)^2}{2 \cdot T_p^3} + C \cdot \frac{(\Delta\theta 1) \cdot (\Delta\theta 2)}{2 \cdot T_p^3}$$

where:

$$A = A1 + A2 \cdot \cos\theta 2(P)$$

$$\dot{B} = B1$$

$$C = C1 + C2 \cdot \cos\theta 2(P) \quad (20)$$

In Eq. (20), new constants A, B, C are used in place of the former constants in order to simplify the form of the expression.

However, a problem is encountered in that it is not clear which technique is needed to shorten the tact time under the conditions pertaining to Eq. (19). This problem will now be discussed.

In order to find the value of the power W (i.e. maximum W) to minimize the peak time Tp in Eq. (19), while operating the robot in accordance with the acceleration-deceleration curve (FIG. 4) in a manner which induces displacements $\Delta\theta 1$ and $\Delta\theta 2$ of the arms b1 and b2, the boundary condition of Eq. (21) must be satisfied.

$$W = W1m \text{ when } \Delta\theta 2 = 0$$

$$W = W2m \text{ when } \Delta\theta 1 = 0 \quad (21)$$

The above boundary condition signifies that, when one of the arms is not moved, the tact time is minimized by rotating the other arm with the maximum output of the motor.

Since the power W is obtained as a solution to the above, it becomes possible to operate the robot with a minimum peak time by utilizing the power of the driving motor to a maximum extent.

The concept which evolves in view of this problem is that the tact time may be minimized by operating the robot with the maximum output of both arm driving motors.

According to this concept, however, the desired synchronism between the acceleration-deceleration curves of both arms may not be attained exactly, and further it is not clear whether the outputs of the motors are properly assigned to the individual terms of the right side of Eq. (20).

Clarifying the above problem further, the following solution may be achieved.

First, when the fore end of the robot arm is to be displaced from one position to another, the energy required for the displacement is as mentioned 2·E(all:P).

This energy is supplied from the two arm driving motors for the time of $0 \leq t \leq 2 \cdot Tp$ during which, as given by Eq. (7), the robot is in motion, so that the above energy is equal to the value obtained by multiplying the energy W per unit time by the required time 2·Tp.

If the energy can be completely transferred between the two arms in such a manner that the energy of the driving motor for one arm is usable for moving the other arm, then the tact time can be minimized by rotating each driving motor with its maximum output.

However, due to the existence of certain restrictions on the energy distribution, the circumstances in actual practice are different.

It becomes apparent from the following physical considerations that, with regard to the first and third terms of the right side of Eq. (20), the energy is supplied from the driving motor for the first arm b1, whereas with regard to the second term of the right side of Eq. (20), the energy is supplied from the driving motor for the second arm b2.

Figure 7:
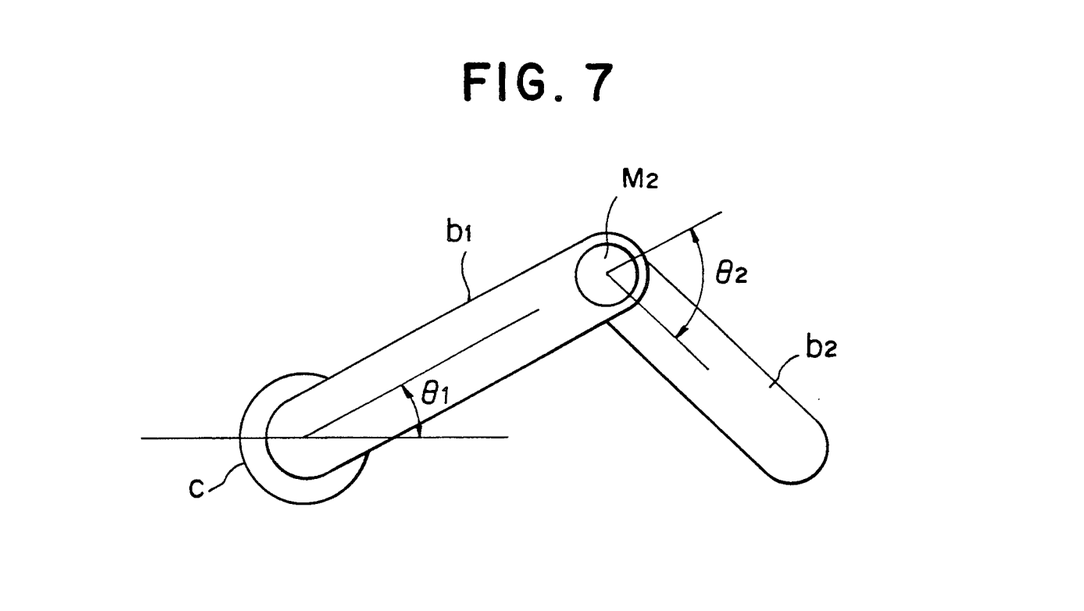
FIG. 7 is a plan view showing the structure of a biaxial scalar type robot.

FIG. 7 is a plan view schematically illustrating a biaxial scalar type robot, wherein a driving motor M2 for a second arm b2 is firmly secured to a first arm b1.

The first arm b1 is rotatably connected to an axial base portion c. Suppose that the servo control for the first arm b1 is released. Then, in view of the coordinate system fixed in the axial base portion c, the generated torque of the motor M2 inclusive of the first arm b1 is an internal force couple, which is incapable of changing the angle $\theta 1$ of the first arm b1.

If the second arm b2 is displaced (rotated) by such torque, it follows that the inertial center of the second arm b2 is also displaced. However, since the inertial center of the entire system, including both the first and second arms, remains unchanged (as the torque of the motor M2 is an internal one) the inertial center of the first arm b1 is displaced whereby the angle $\theta 1$ is changed.

Consequently, in this case, the power W2 of the motor M2 is distributed as the energies for the arms b1 and b2.

Under the conditions wherein the first arm b1 is firmly connected to the axial base portion (i.e., when position servo control is being executed), the second arm b2 alone is moved and the output power W2 is consumed merely for such displacement.

During the operation of the robot, servo control is executed on the driving motor for the first arm b1 and, if such servo control is functionally sufficient, the effect thereof is substantially the same as that in holding the first arm b1 in place. The condition that each arm is movable precisely in accordance with any command value as mentioned in previously listed assumption (2) as one analytic premise for the robot system ensures such circumstances.

Summing up the above, as given by Eq. (22) W1 is consumed as the power for the square term of $\Delta\theta 1$ and the associated term of $\Delta\theta 1$ and $\Delta\theta 2$ in Eq. (20), while W2 is consumed as the power for the square term of $\Delta\theta 2$ in Eq. (20).

$$W = W1 + W2 \quad (22)$$

$$W1 = A \cdot \frac{(\Delta\theta 1)^2}{2 \cdot T_p^3} + C \cdot \frac{(\Delta\theta 1) \cdot (\Delta\theta 2)}{2 \cdot T_p^3}$$

$$W2 = B \cdot \frac{(\Delta\theta 2)^2}{2 \cdot T_p^3}$$

As the essence of the problem is thus rendered obvious, a technique for shortening the tact time, i.e. for minimizing the peak time Tp, can be achieved.

Figure 8:
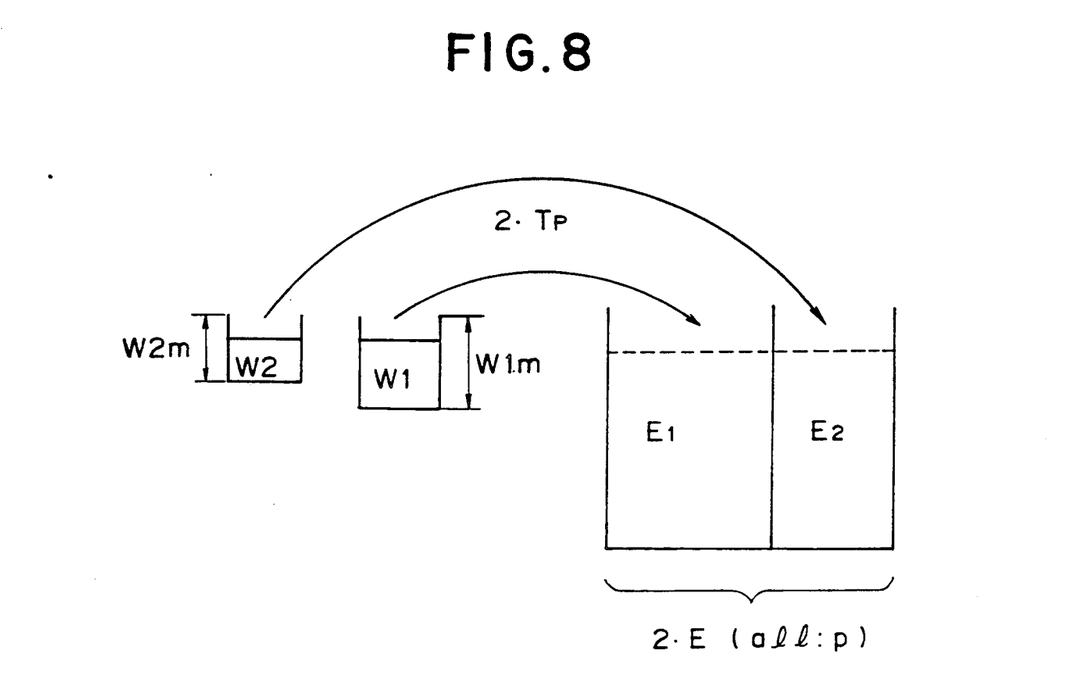
FIG. 8 is a conceptual diagram showing energy and power distributions.

FIG. 8 is a conceptual diagram showing the relationship of the energy distribution according to the above mentioned problem. The total energy $2 \cdot E(all:P)$ required for operating the robot is composed of E2 for displacement of the second arm b2 and E1. The energy E1 is supplied to induce a power W1 (maximum value W1m) per unit time, while the energy E2 is supplied to induce a power W2 (maximum value W2m) per unit time.

In this case, the powers W1, W2 are supplied during the predetermined time $2 \cdot Tp$ so that the required energies E1, E2 are obtained. The core of the problem resides in ascertaining how the peak time Tp can be minimized by supplying the power the least number of times.

The solution to this problem depends upon the relationship between the length of the time required until energy E1 is obtained while supplying the maximum W1m of the power W1, and the length of the time required until energy E2 is obtained while supplying the maximum W2m of the power W2.

If the required time E1/W1 is compared with the time E2/W2, and the former is longer, it is impossible to further reduce the required time. However, if the latter is longer than the former, the required time may be further reducible.

This fact is mathematically represented by Eqs. (23) through (27).

First, the time Tp calculated under the condition of $W1 = W1m$ in Eq. (22) is defined as Tp(1), and the time Tp calculated under the condition of $W2 = W2m$ is defined as Tp(2). That is, Tp(1) and Tp(2) are obtained as solutions to satisfy Eq. (23) below:

$$W1m = A \cdot \frac{(\Delta\theta 1)^2}{2 \cdot [T_p(1)]^3} + C \cdot \frac{(\Delta\theta 1) \cdot (\Delta\theta 2)}{2 \cdot [T_p(1)]^3} \quad (23)$$

$$W2m = B \cdot \frac{(\Delta\theta 2)^2}{2 \cdot [T_p(2)]^3}$$

The double values of such Tp(1) and Tp(2) correspond to the periods of time required for energy supply in the individual cases. Further, as given by Eq. (24), the greatest value of Tp(1), Tp(2) and $Tp^{MIN}$ is selected as final Tp, where $Tp^{MIN}$ denotes the minimum peak time derived from the restriction of the frequency (f) characteristics in the servo control.

$$Tp = MAX\{Tp(1), Tp(2), Tp^{MIN}\} \quad (24)$$

The values of W1 and W2 are determined by the use of Tp thus obtained.

This aspect will now be described below with respect to the individual cases depending on the relative lengths of Tp(1) and Tp(2). [i] *When $Tp = Tp(1)$ $Tp(2)$*

In this case, W1 is equal to the maximum W1m, while W2 has the value obtained by substituting $Tp = Tp(1)$ for the third expression of Eq. (22). The above situation can be represented by Eq. (25) as follows:

$$T_p = T_p(1) \quad (25)$$

$$W1 = W1m = A \cdot \frac{(\Delta\theta 1)^2}{2 \cdot T_p^3} + C \cdot \frac{(\Delta\theta 1) \cdot (\Delta\theta 2)}{2 \cdot T_p^3}$$

$$W2m = B \cdot \frac{(\Delta\theta 2)^2}{2 \cdot T_p^3}$$

$$W = W1 + W2 = W1m + B \cdot \frac{(\Delta\theta 2)^2}{2 \cdot T_p^3}$$

[ii] When $Tp = Tp(2)$ $Tp(1)$

In the opposite situation wherein W2 is equal to the maximum W2m, while W1 has the value obtained by substituting $Tp = Tp(2)$ for the second expression of Eq. (22), then the situation is represented by Eq. (26) below:

$$T_p = T_p(2) \quad (26)$$

$$W1 = A \cdot \frac{(\Delta\theta 1)^2}{2 \cdot T_p^3} + C \cdot \frac{(\Delta\theta 1) \cdot (\Delta\theta 2)}{2 \cdot T_p^3}$$

$$W2 = W2m = B \cdot \frac{(\Delta\theta 2)^2}{2 \cdot T_p^3}$$

-continued $$W = W1 + W2 = A \cdot \frac{(\Delta\theta 1)^2}{2 \cdot T_p^3} + C \cdot \frac{(\Delta\theta 1) \cdot (\Delta\theta 2)}{2 \cdot T_p^3} + W2m$$

[iii] When Tp=Tp(1)=Tp(2)

In this case, both W1 and W2 are equal to the maxima thereof respectively, as represented by Eq. (27) below:

$$T_p = T_p(1) = T_p(2)$$

$$W1 = W1m$$

$$W2 = W2m$$

$$W = W1m + W2m \tag{27}$$

Figure 9:
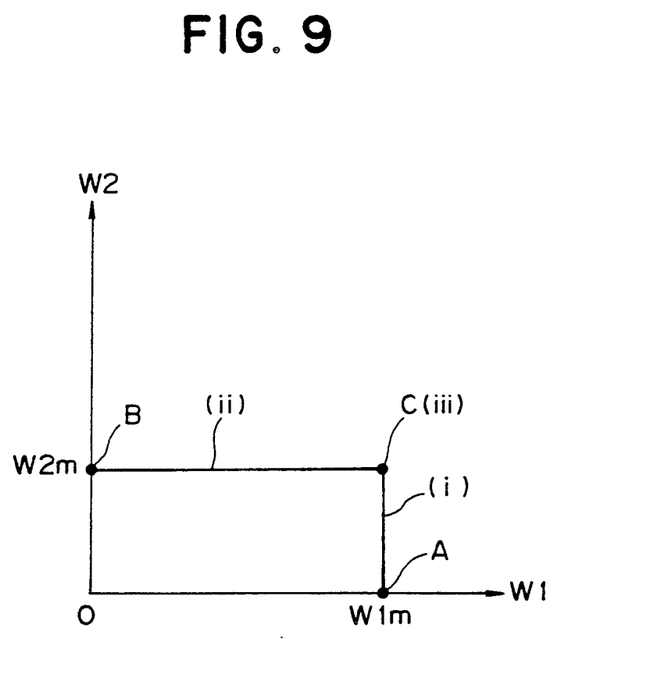
FIG. 9 is a two-dimensional graphic representation showing the power of each driving motor.

FIG. 9 graphically shows the powers of the driving motors and facilitating a visual appreciation of situations [i] through [iii], W1 is taken along the abscissa and W2 along the ordinate.

As is obvious from Eq. (19) mentioned above, the region allowable as a variability domain of W1 and W2 is a rectangular area (including the boundary) in FIG. 9 defined by the origin 0 (0, 0), point A (W1m, 0), point B (0, W2m) and point C (W1m, W2m). The point A corresponds to the former of the two boundary conditions given by Eq. (21) i.e. W=W1=W1m, W2=0 ({$\theta$2=0); and the point B corresponds to the latter boundary conditions of Eq. 21, i.e. W=W2=W2m, W1=0 ($\Delta\theta$1=0). For example, the point A includes the aspect shown in FIG. 12, wherein the difference between the states of the arms in (a) and (b) is expressed by the cos term of the coefficient A in Eq. (20).

Situations [i] through [iii] (mentioned above) are positioned on the boundary where W1=W1m and W2=W2m. In such states on this boundary, the power for the driving motors can be drawn out most efficiently to minimize the tact time.

The point A on the line of W1=W1m represents [i]; the point B on the line of W2=W2m represents [ii]; and the point C at the intersection thereof represents [iii].

The solution for minimizing the tact time has thus been obtained. Hereinafter a description will be given on a method and an apparatus for generating acceleration and deceleration patterns based on the above theory.

Prior to explaining the construction of the apparatus, a control mode will first be described below, including a summary of the considerations given above.

Figure 2:
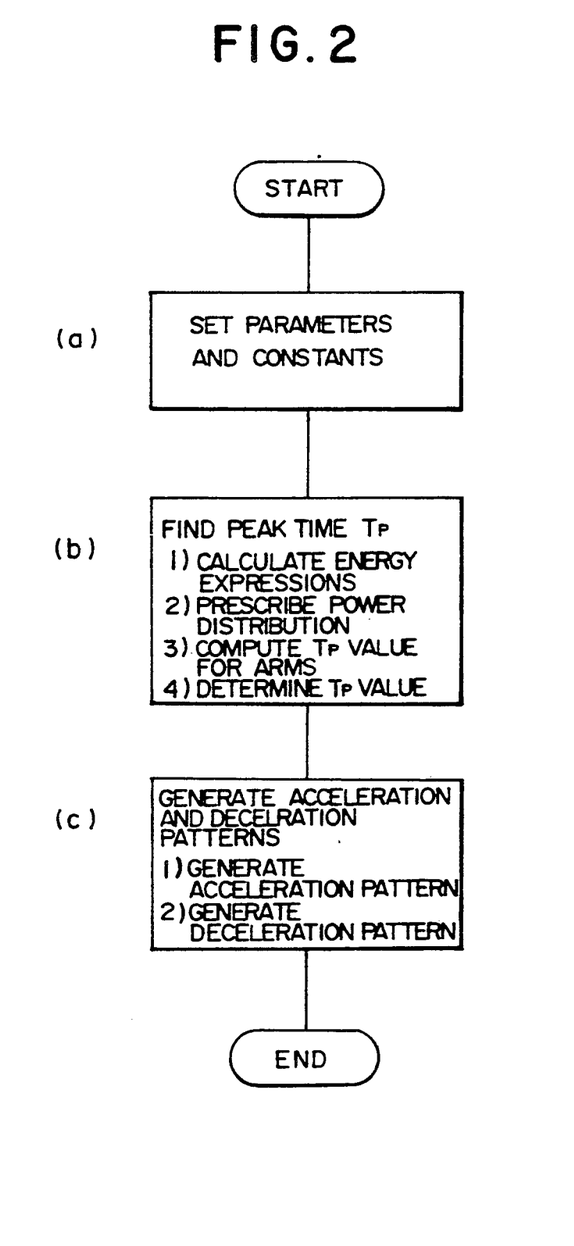
FIG. 2 is a flow chart of an algorithm executed by the acceleration-deceleration pattern generating method according to the present invention.

The acceleration-deceleration pattern generating method of the present invention is broadly divided into the following three procedures as shown in FIG. 2.

(a) Setting of parameters and constants.

The dynamic constants (A1, A2, B1, etc.) and the maximum output values (W1m, W2m) of the driving motors are set in advance. Thereafter, such values are kept unchanged. The dynamic parameters ($\neq\theta$1, $\Delta\theta$2, etc.), conforming with commands for operating the robot, are set to proper values in response to each command.

(b) Calculation of peak time Tp.

The discussion developed hereinabove is concerned mostly with a logical explication of this calculation. The essential points thereof are summarized as follows.

(b-1) Calculation of energy expression.

The energy of the entire system represented by Eq. (4) is calculated from the dynamic analysis of the robot.

(b-2) Prescription of power distribution.

The contribution of the power of each arm driving motor to each term of the energy expression is dynamically analyzed.

(b-3) Calculation of Tp value per arm.

After prescription of the power distribution, there are calculated, as shown in Eq. (23), temporary Tp values (Tp(1), Tp(2)) when the power term per arm is equal to the maximum output of the relevant motor.

(b-4) Determination of Tp value.

The maximum out of some Tp values mentioned above is selected as a practical Tp value.

(c) Generation of acceleration and deceleration patterns.

As for specific generation of the pattern, it is possible to adopt the method proposed by the present applicant in Japanese Patent Application No. Hei 2 (1990)-283867, now Japanese Published Application No. 4-157508. Merely the principal point thereof will now be described below.

(c-1) Generation of acceleration pattern.

First, an acceleration pattern represented by the use of a function standardized with regard to a displacement is prepared. The peak time in the pattern is set to a predetermined value.

In generating the acceleration pattern, a desired function is obtained through multiplication of a standard function by the displacement (strictly, by a proportional coefficient for correction of the displacement), and a temporal scale conversion is executed for the standard function by using, as a conversion parameter, the ratio of the Tp value, which is the result of the calculation in (b), to the standard Tp value. Namely, in comparison with the known method disclosed in the cited Japanese Patent Application No. Hei 2 (1990)-283867, now Japanese Published Application No. 4-157508, where the Tp value is prescribed on the basis of the displacement, the present invention is based on the concept that the optimal Tp value is prescribed on the basis of the dynamic analysis of the robot system.

(c-2) Generation of deceleration pattern.

A predetermined procedure is carried out to form a curve temporally symmetrical with the acceleration pattern. That is, a deceleration pattern is generated by causing changes of velocity which are exactly reverse to those of the acceleration pattern.

Such acceleration and deceleration patterns are generated for each of the arms. (See FIG. 4)

It is particularly noted that, in the present invention, there exists no restriction on any concrete form of the acceleration-deceleration curve.

More specifically, the form of the acceleration-deceleration curve is not limited merely to the aforementioned triangular one which is given merely as an example in the above discussion. Since the expression corresponding to Eq. (23) becomes relatively complex, it becomes possible to solve the peak time Tp algebraically as given by Eq. (9) or (10). However, Tp(1) and Tp(2) can be calculated by numerically solving the general expressions F(Tp)=W1m and G(Tp)=W2m relative to Eq. (23). However, such mathematical problems are not an essential feature of the present invention.

Figure 1:
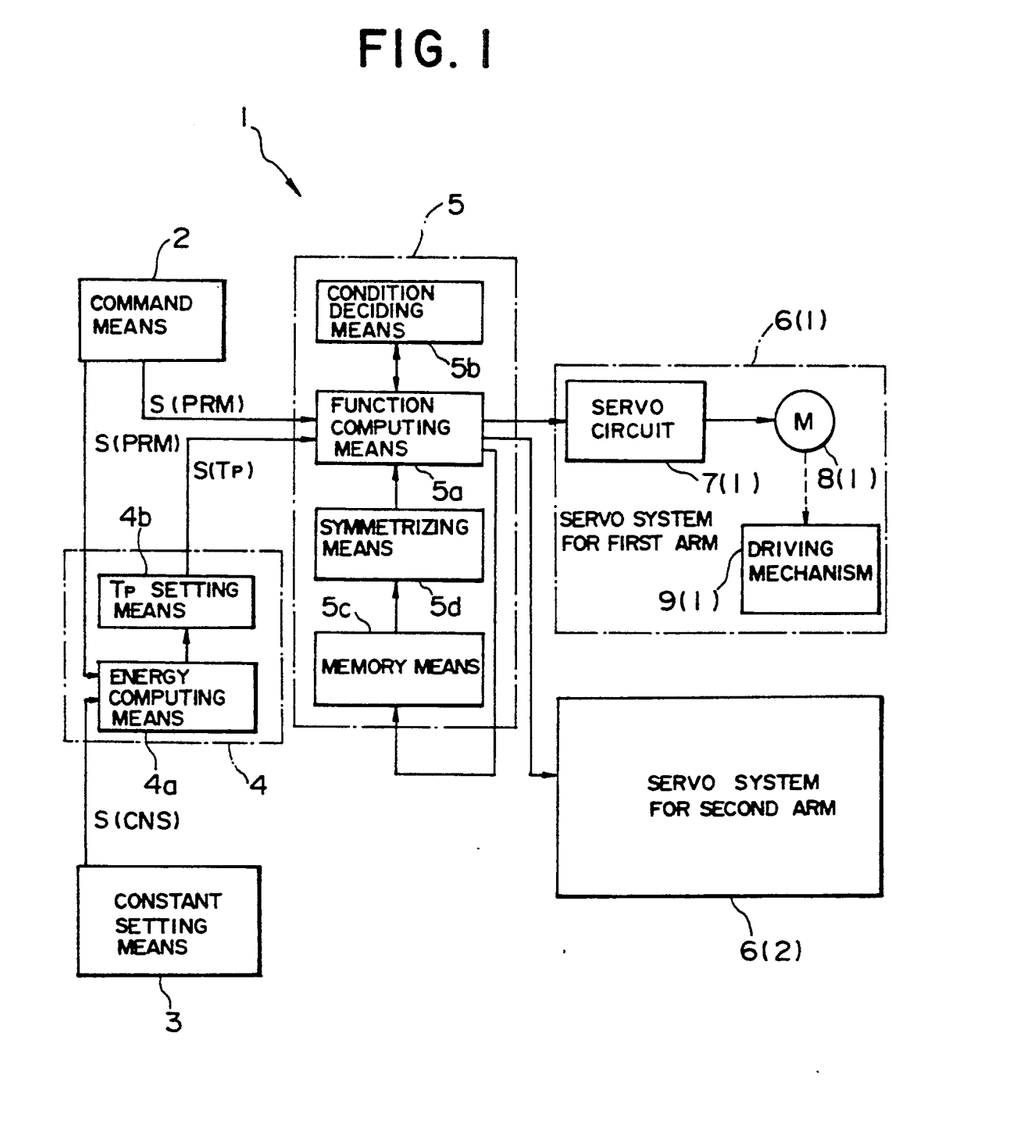
FIG. 1 is a block diagram of an acceleration-deceleration pattern generating apparatus embodying the present invention.

FIG. 1 is a block diagram showing an example of an apparatus for carrying out the pattern generating method mentioned above.

As shown in the diagram, the acceleration-deceleration pattern generating apparatus 1 comprises a command means 2, a constant setting means 3, a peak time calculating means 4 and a pattern generating means 5, wherein a control signal relative to a generated acceleration-deceleration pattern is output to a servo system 6(1) for a first arm b1 and also to a servo system 6(2) for a second arm b2.

Practically, the individual components which comprise the acceleration-deceleration pattern generating apparatus 1, may be implemented by software; and it is the functions thereof which are visually shown in the diagram.

The command means 2 is responsive to each robot operating command and delivers a command signal S(PRM) in the form of a predetermined dynamic parameter such as $\Delta\theta 1$ or $\Delta\theta 2$, to the peak time calculating means 4 and the pattern generating means 5.

The constant setting means 3 serves to set predetermined dynamic constants (A1, A2, B1, etc.) and maximum outputs (W1m, W2m) of the driving motors. After completion of such setting, the set values are retained without any alteration unless the robot to be controlled is changed.

The peak time calculating means 4 consists of an energy computing means 4a and a Tp setting means 4b.

The energy computing means 4a receives a constant setting signal S(CNS) from the constant setting means 3 or a command signal S(PRM) from the command means 2, then executes the calculation of Eq. (23) in conformity with the information thus received, and delivers the resultant value of Tp(1) or Tp(2) to the Tp setting means 4b.

The Tp setting means 4b selects the greatest value as Tp according to Eq. (24) and sends a command signal S(Tp) to the pattern generating means 5.

The pattern generating means 5 consists of a function computing means 5a, a condition deciding means 5b, a memory means 5c and a symmetrizing means 5d.

The function computing means 5a serves to compute the function for generating a desired acceleration or deceleration pattern which conforms with the signal S(PRM) from the command means 2 or the signal S(Tp) from the peak time calculating means.

Namely, the operation regarding the standard function is performed as described in (C) above relative to the acceleration and deceleration pattern generating method.

The memory means 5c and the symmetrizing means 5d are concerned with generation of a deceleration pattern.

More specifically, the velocity values relative to the acceleration pattern obtained by the function Computing means 5a are sequentially stored in the memory means 5c in the order of the lapse of time, and in the subsequent deceleration period, the velocity values stored in the memory 5c are sequentially read out therefrom by the symmetrizing means 5d in the order reverse to the storage sequence, whereby a deceleration pattern is generated. This procedure forms a desired deceleration pattern where the changes of the velocity in the acceleration pattern are reflected with respect to the time.

The condition deciding means 5b makes a decision over a control mode in response to the command signal S(PRM), in such a manner as to select, for example, one control mode for proceeding to deceleration from acceleration via fixed-velocity control when the result of computing the angular velocity is prone to exceed the allowable maximum value in the motor. After such a decision relative to the pattern generation, an instruction is output to the function computing means 5a.

The acceleration-deceleration pattern generation is performed in parallel with the arm driving axes, and the control values obtained as a result of the pattern generation, are output to the servo systems 6(1) and 6(2) respectively.

Of the control values delivered from the function computing means 5a, the value relevant to control of the first arm b1 is supplied to a servo circuit 7(1) of the servo system 6(1), whereby the rotation control of a motor 8(1) is executed in conformity with one acceleration-deceleration curve of FIG. 4 (having a higher peak), so that the first arm b1 is actuated via a driving mechanism 9(1).

Since the servo system 6(2) for the second arm b2 is structurally the same as the servo system 6(1), the internal construction is omitted from the diagram. Operation is such that the rotation of the motor is controlled in conformity with the other acceleration-deceleration curve of FIG. 4 (having a lower peak) by the control value output from the function computing means 5a. Finally the motion of the second arm b2 is prescribed.

According to the present invention, as will be apparent from the description given hereinabove, either of a plurality of driving axes having relationship of mutual dynamic interference, is moved with the allowable maximum power of the driving source on the basis of analyzing the energy and power distribution relative to the servo system, so that the capability of the driving source can be fully utilized to the utmost extent and therefore minimize the time required for a desired displacement.

Furthermore, due to the clarity of its algorithm, the control action is not dominated by any experimental data or the experience of an operator or designer.

In accordance with the present invention, a minimum number of experiments need be carried out since the dynamic constants (A1, A2, B1, etc.) are calculated from the data based on the measurement according to Eqs. (16) through (18) without the use of Eq. (5). However, such experiments are based merely on the logical analysis, and the characteristics thereof reside in an attempt to perform proper control for the actual action of each arm.

These characteristics are different for experiments conducted for the purpose of searching for modes of control.

It is a matter of course that the present the invention is applicable in general to any servo system equipped with a multiplicity of driving axes. In such instances, the techniques is such that the power distribution for each driving axis is prescribed, the temporary peak time with regard to each axis on the basis of the maximum power value per axis, is calculated, following which the greatest value is selected as the peak time for the entire system.

What is claimed is:

1. An apparatus for generating acceleration and deceleration patterns for a servo system having at least a first and second moveable axes, each of said first and second axes having an associated drive means and wherein the motion of one of said moveable axes may exert dynamic interference with regard to motion of the other of said moveable axes, the acceleration and deceleration patterns for said first and second moveable axes having synchronized acceleration start points, velocity peak points and deceleration points, said apparatus comprising:

a constant setting means for setting dynamic constants specific to said servo system;

a command means responsive to displacement instructions for setting predetermined dynamic parameters;

peak time calculating means responsive to said constant setting means and said command means for calculating and setting the peak time required until a velocity peak is reached in the acceleration-deceleration pattern, said peak time calculating means including an energy computing means and peak time setting means, wherein said energy computing means is operable for computing the total kinetic energy required for the commanded displacement, as a function of the peak time on the basis of the dynamic constants and dynamic parameters and for proscribing the power to be contributed by each of said drive means, said energy computing means serving to proscribe which of the driving sources is to supply power to each energy term comprising said total kinetic energy, and for calculating the peak time when the energy from each of the drive means is equal to the maximum power value allowable for said drive means, said peak time setting means being operable to set the maximum of the peak time values calculated by said energy computing means; and an acceleration-deceleration pattern generating means responsive to the peak time from said peak time setting means for generating an acceleration pattern whereby the time required for a velocity to reach a peak after an acceleration start point, is equal to the peak time from said peak time setting means, and for generating a deceleration pattern which is temporally symmetric with respect to said acceleration pattern.

2. The apparatus according to claim 1, wherein said command means is operable to generate start and stop and positions for each displacement of said moveable axes.

3. The apparatus according to claim 1 wherein said dynamic constants include maximum output values for said driving means.

4. The apparatus according to claim 1, wherein said total energy is calculated based on the equation:

$$E(all:P) = \tfrac{1}{2}(A1 + A2 \cdot Cos\theta 2(P)) \cdot$$

$$[W1(P)^2 + \tfrac{1}{2} \cdot B1 \cdot [W2(P)]^2 +$$

$$\tfrac{1}{2} \cdot [C1 + C2 \cdot Cos\theta 2(P)] \cdot W1(P) \cdot W2(P)$$

where:

A1, A2, B1, C1 and C2 are dynamic constants specific to the geometry, mass and internal movement of the servo system.

$\theta 1$ is the angle formed by said first moveable axis with respect to the X-axis.

$\theta 2$ is the angle formed by said second moveable axis with respect to said first moveable axis:

$$W1 = \frac{d\theta 1}{dt}$$

$$W2 = \frac{d\theta 2}{dt}$$

5. A method of generating acceleration and deceleration patterns for a servo system having at least first and second moveable axes, each of said first and second axes having an associated drive means and wherein the motion of one of said moveable axes may exert dynamic interference with regard to the motion of the other moveable axis, the acceleration and deceleration patterns for said first and second moveable axis having synchronized acceleration starts points, velocity peak points and deceleration end points, said method comprising the steps of:

(a) setting dynamic constants specific to the servo system and dynamic parameters, including start and end positions of each displacement of said moveable arms and expressing the dynamic parameters as a function of the peak time required for the velocity in the acceleration-deceleration pattern to each a peak;

(b) calculating, based on said dynamic constants and dynamic parameters, the total kinetic energy required for the displacement and proscribing the power to be contributed by each of the drive means to each energy term comprising said total kinetic energy;

(c) calculating the peak time when the energy term supplied with the power from each of the drive means is equal to a maximum allowable power value for said drive means;

(d) selecting, as the peak time of said servo system, the maximum of the peak time values calculated; and (e) generating an acceleration pattern relative to each moveable axis whereby the time required for a velocity to reach a peak after an acceleration start point is equal to the peak time obtained in step (d), and generating a deceleration pattern which is temporally symmetric with respect to said acceleration pattern.

6. The method according to claim 2, wherein said total energy is calculated based on the equation:

$$E(all:P) = \tfrac{1}{2}(A1 + A2 \cdot Cos\theta 2(P)) \cdot$$

$$[W1(P)^2 + \tfrac{1}{2} \cdot B1 \cdot [W2(P)]^2 +$$

$$\tfrac{1}{2} \cdot [C1 + C2 \cdot Cos\theta 2(P)] \cdot W1(P) \cdot W2(P)$$

where:

A1, A2, B1, C1 and C2 are dynamic constants specific to the geometry, mass and internal movements of the servo system.

$\theta 1$ is the angle formed by said first moveable axis with respect to the X-axis.

$\theta 2$ is the angle formed by said second moveable axis with respect to said first moveable axis:

$$W1 = \frac{d\theta 1}{dt}$$

$$W2 = \frac{d\theta 2}{dt}$$

* * * * *